J. T. FAGAN & C. H. QUACKENBUSH.
EXHAUSTING MACHINE.
APPLICATION FILED DEC. 2, 1914.

1,210,620.

Patented Jan. 2, 1917.

WITNESSES:
J. Ellis Glen
Anthony Mars

INVENTORS:
JOHN T. FAGAN,
CLEVELAND H. QUACKENBUSH,
BY Albert H. Davis
THEIR ATTORNEY I. T. FAGAN & C. H. QUACKENBUSH.
EXHAUSTING MACHINE.
APPLICATION FILED DEC. 2, 1914.

1,210,620.

Patented Jan. 2, 1917.
11 SHEETS—SHEET 2.

FIG. 3.

WITNESSES:

INVENTORS:
JOHN T. FAGAN,
CLEVELAND H. QUACKENBUSH,
BY
THEIR ATTORNEY.

J. T. FAGAN & C. H. QUACKENBUSH.
EXHAUSTING MACHINE.
APPLICATION FILED DEC. 2, 1914.

1,210,620.

Patented Jan. 2, 1917.
11 SHEETS—SHEET 3.

WITNESSES:
J. Ellis Glen
Anthony Mart.

INVENTORS:
JOHN T. FAGAN,
CLEVELAND H. QUACKENBUSH,
BY Albert G. Davis
THEIR ATTORNEY.

J. T. FAGAN & C. H. QUACKENBUSH.
EXHAUSTING MACHINE.
APPLICATION FILED DEC. 2, 1914.

1,210,620.

Patented Jan. 2, 1917.
11 SHEETS—SHEET 6.

WITNESSES:

INVENTORS.
JOHN T. FAGAN,
CLEVELAND H. QUACKENBUSH,
BY
THEIR ATTORNEY.

J. T. FAGAN & C. H. QUACKENBUSH.
EXHAUSTING MACHINE.
APPLICATION FILED DEC. 2, 1914.

1,210,620.

Patented Jan. 2, 1917.
11 SHEETS—SHEET 7.

WITNESSES:
J. Ellis Glen
Anthony May

INVENTORS:
JOHN T. FAGAN,
CLEVELAND H. QUACKENBUSH,
BY
THEIR ATTORNEY.

J. T. FAGAN & C. H. QUACKENBUSH.
EXHAUSTING MACHINE.
APPLICATION FILED DEC. 2, 1914.

1,210,620.

Patented Jan. 2, 1917.
11 SHEETS—SHEET 8.

WITNESSES.

INVENTORS:
JOHN T. FAGAN,
CLEVELAND H. QUACKENBUSH,
BY
THEIR ATTORNEY.

J. T. FAGAN & C. H. QUACKENBUSH.
EXHAUSTING MACHINE.
APPLICATION FILED DEC. 2, 1914.

1,210,620.

Patented Jan. 2, 1917.
11 SHEETS—SHEET 9.

WITNESSES:
J. Ellis Glen
Anthony Mart

INVENTORS:
JOHN T. FAGAN,
CLEVELAND H. QUACKENBUSH,
BY
THEIR ATTORNEY.

UNITED STATES PATENT OFFICE.

JOHN T. FAGAN AND CLEVELAND H. QUACKENBUSH, OF CLEVELAND, OHIO, ASSIGNORS TO GENERAL ELECTRIC COMPANY, A CORPORATION OF NEW YORK.

EXHAUSTING-MACHINE.

1,210,620.   Specification of Letters Patent.   Patented Jan. 2, 1917.

Application filed December 2, 1914. Serial No. 875,194.

*To all whom it may concern:*

Be it known that we, JOHN T. FAGAN and CLEVELAND H. QUACKENBUSH, citizens of the United States, and residents of Cleveland, county of Cuyahoga, State of Ohio, have invented certain new and useful Improvements in Exhausting-Machines, of which the following is a specification.

Our invention relates to apparatus for exhausting incandescent lamp bulbs and other articles in which a vacuum is required.

More specifically considered, our invention relates to that type of machine disclosed in the Massey Patent No. 996,936, issued July 4, 1911, and in the Burrows Patent No. 973,625, issued October 25, 1910. That type of machine comprises carrying means for a series of lamp bulbs and means whereby the said bulbs are gradually evacuated during their movement. In the machines disclosed in the aforesaid patents the lamps are transferred successively to each of a series of pumps. The said pumps are all stationary and it is necessary, therefore, for the apparatus to include a valve having members movable relatively to each other, which valve is located not only between the lamps and the preliminary pumps, but also between said lamps and the final pump. The valve fitting must be very good in order to preserve the high vacuum of the lamp in its final form and has caused considerable trouble.

One of the objects of our invention is to provide an apparatus in which this valve trouble will be largely obviated.

According to our invention, during all except the preliminary stages of the evacuation, the lamps are connected directly to the final pump without the interposition of a valve. This is accomplished by mounting the final pump to move with the lamps. In its preferred form the machine is rotary and a number of the said final pumps are provided, each being connected to a predetermined number of lamps, the said pumps being mounted on the rotary carrier with the said lamps. It is preferred to have a rough pump for preliminary evacuation, and this may be stationary, with a valve having relatively rotatable parts interposed between the same and the lamps. It is preferred also to have a stationary backing pump in connection with the final pumps, and the aforesaid valve parts may be utilized for this purpose. However, the vacuum to be preserved in each case is not very high, and therefore, the use of a valve does not cause difficulty.

Our invention also comprises improved means for heating the bulbs during evacuation and means for opening and shifting the heating means to allow the removal of the exhausted lamps and the insertion of new lamps.

Our invention also comprises means for connecting and disconnecting the lamps to the rough pump and to the final pump.

Various other features of our invention will appear from the detailed description of a species thereof which follows and from the accompanying drawing illustrating the same.

Figure 1:
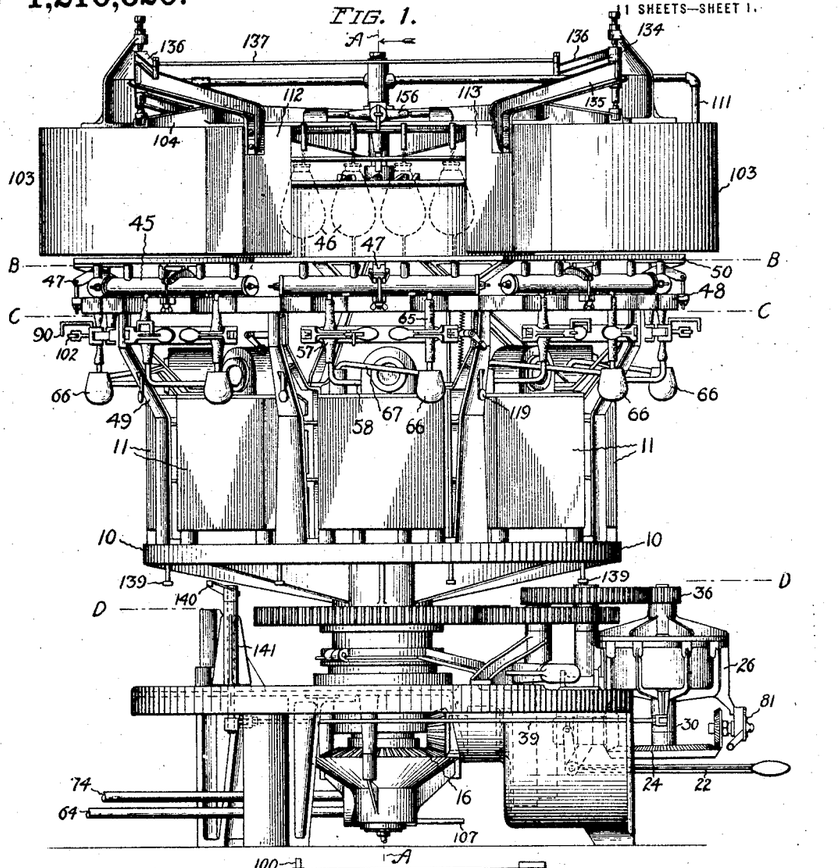
Figure 1 is an elevation of one machine embodying our invention.
Figure 2:
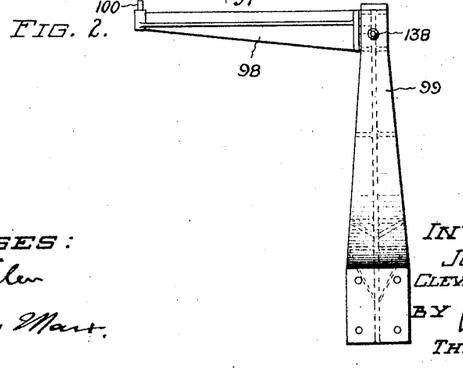
Fig. 2 is a detail view of the tripping bracket which operates various parts.
Figure 3:
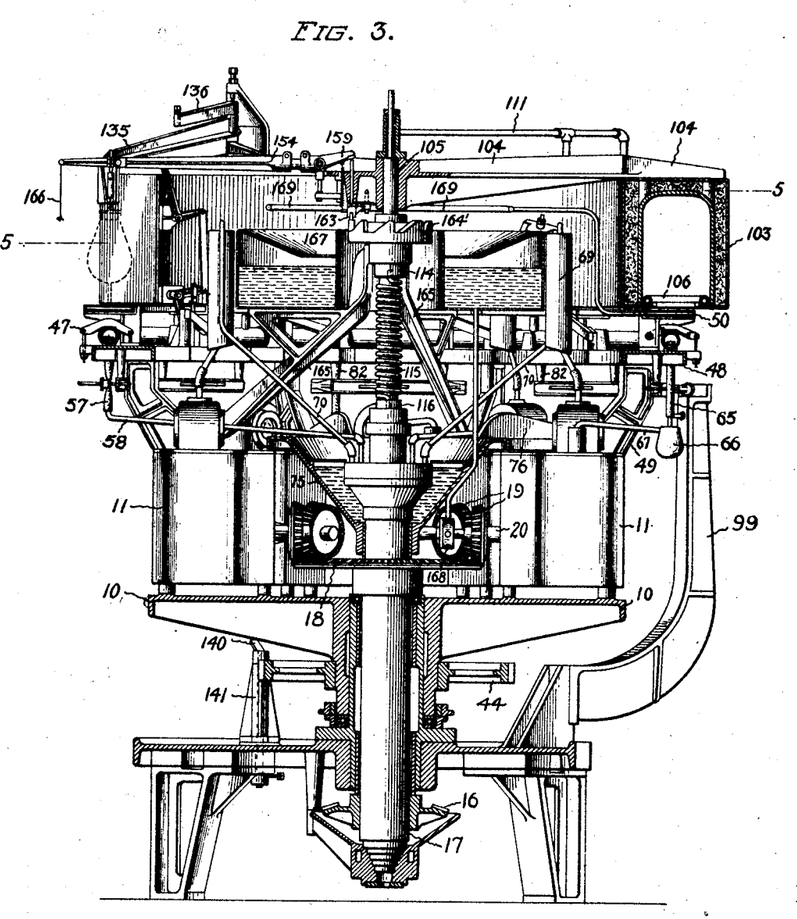
Fig. 3 is a vertical section taken on the line A—A of Fig. 1.
Figure 12:
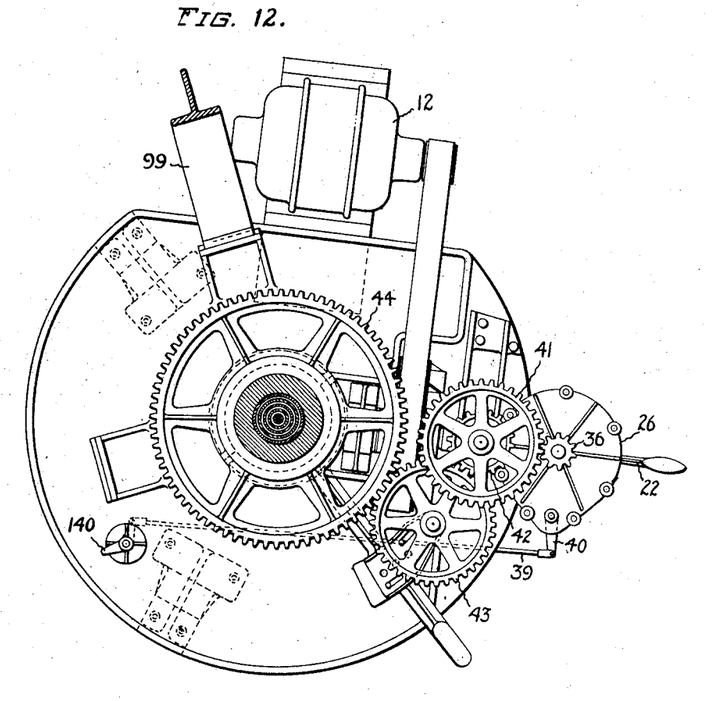
Fig. 12 is a horizontal section on the line D—D of Fig. 1.
Figure 13:
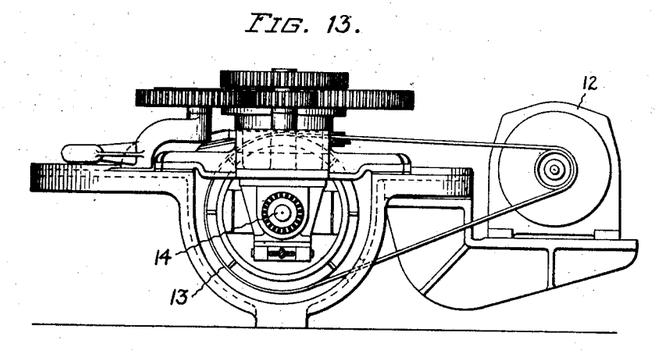
Fig. 13 is an elevation, partly in section, of the drive partially shown in Fig. 12.
Figures 14, 15:
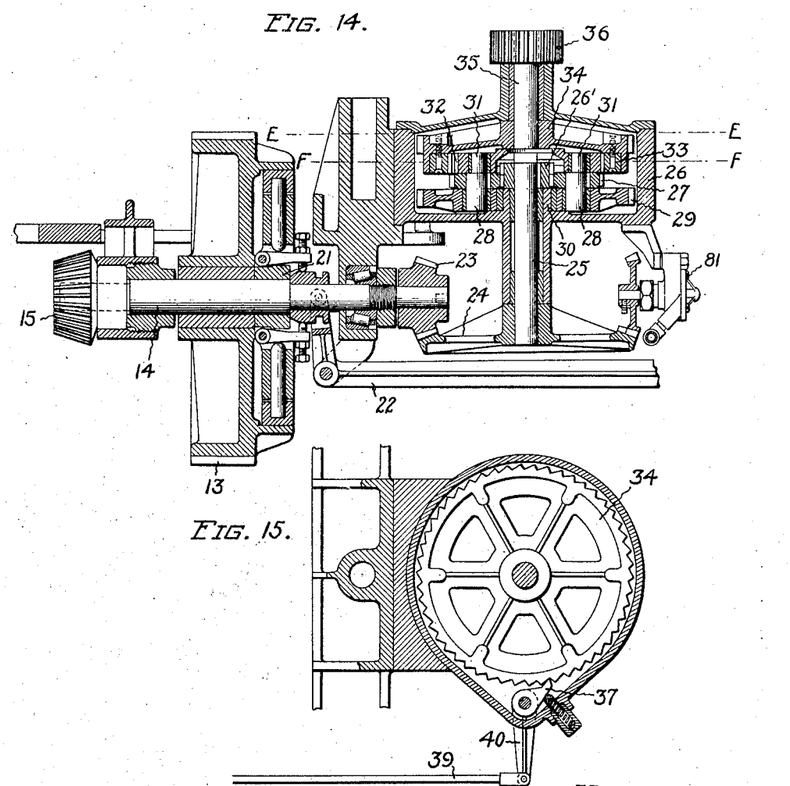
Fig. 14 is a vertical section of the transmission gearing for the rotation of the lamp carrier.
Fig. 15 is a horizontal section on the line E—E of Fig. 14.
Figure 16:
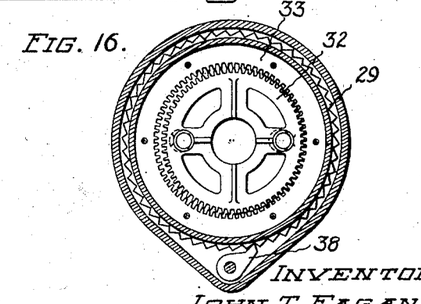
Fig. 16 is a horizontal section on the line F—F of the same figure.
Figure 17:
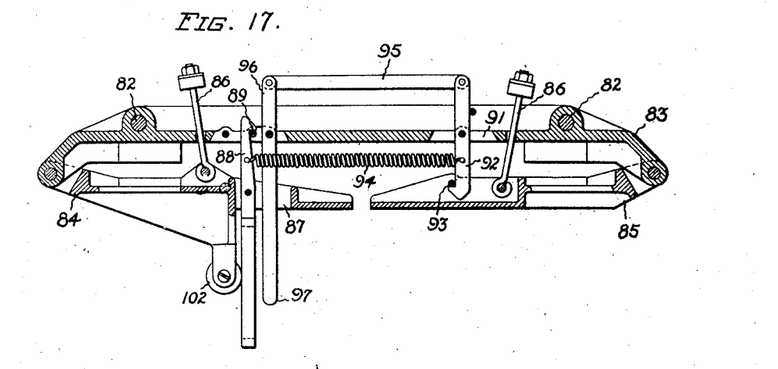
Fig. 17 is a detail in horizontal section of the rubber tube clamping mechanism forming part of the machine.
Figure 18:
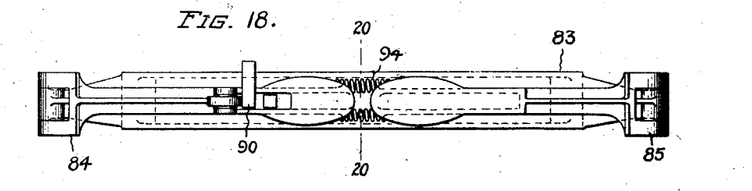
Fig. 18 is an elevation thereof.
Figure 19:
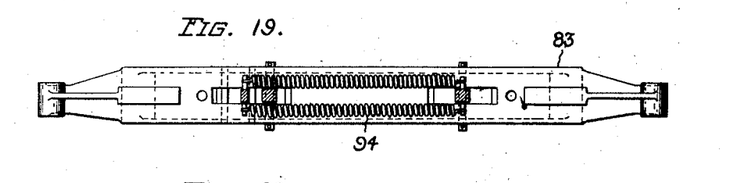
Fig. 19 is also an elevation, partly broken away.

Referring now to the drawing, it will be seen that the machine comprises a rotary table 10 upon which are mounted the final pumps 11, which, as shown, are eight in number, although it is obvious that any desired number of pumps may be used. The said pumps are preferably of the oil type which is well known in connection with this art. The final pumps and the rotary table may be driven by the same source of power, which, as shown in Figs. 12 and 13, may be the motor 12. The said motor drives a pulley 13 mounted on shaft 14. As shown in Fig. 14, the shaft 14 carries at one end the bevel pinion 15. This, as shown in Figs. 1 and 3, engages the horizontally disposed bevel-gear 16, which is fast to the central shaft or column 17 carrying a bevel gear 18, with which engage the bevel pinions 19 on the shafts 20 of the several final pumps. As shown in Fig. 14, a clutch 21 of a well known type, having an operating lever 22, may be provided for connecting and disconnecting the pulley 13 with the shaft 14 and thus starting and stopping the machine. In order to utilize a part of the drive for the pump as a drive for the rotating table 10, it is necessary to employ a speed reducing transmission. To this end, as shown in Figs. 14 to 16 inclusive, the shaft 14 is provided at one end with the bevel pinion 23, which engages the bevel gear 24 on vertical shaft 25. The latter extends into a casing 26 which holds the transmission parts. Mounted on the shaft 25 is a pinion 26' which engages each of two pinions 27 fast to studs 28 rotatably mounted in the disk 29, which is loosely mounted on a hub 30 forming part of the casing 26. Reduced extensions 31 from the studs 28 extend through a horizontally disposed gear 32, the centers of said extensions being eccentric to those of the studs. Surrounding the gear 32 is the interiorly toothed annular disk 33, the opening through which is of somewhat greater diameter than that of the gear 32. The said disk is supported in a member 34 which is fast to a shaft 35 carrying pinion 36. The rotation of the shaft 25 causes the pinion 27 to be rotated and this causes the gear 32 to be moved so that the centers of the extensions 31 will follow substantially elliptical paths. This will cause the teeth on opposite sides of gear 32 to alternately engage the teeth of the annular disk, and the result will be that the said disk will be driven at a very small fraction of the speed at which the shaft 25 is driven. It will be observed that the upper member 34, as well as the lower member 29, is exteriorly toothed. This affords a means of utilizing the transmission as a clutch. As shown in Fig. 15, a spring pressed pawl 37 engages with the teeth on the member 34. A pawl 38 is provided for the lower member 29 and this is operated through a lever 39 attached to arm 40, which is in turn attached to the rod carrying the said pawl. As shown in Fig. 16, the said pawl is in engagement with the said teeth on the disk 29, and this prevents the rotation of the said disk. Under these conditions the upper member 34 will be rotated in a counter clockwise direction and the pawl 37 will ride upon the teeth. However, when the pawl 38 is thrown out through lever 39, the gear 32 will tend to rotate around the annular disk 33, which will remain stationary. The lever 39 is automatically operated in a manner hereafter described. The motion of the pinion 36 is communicated to the table 10 by a train of gears 41, 42, 43 and 44, as shown in Fig. 12, which may be such as to further reduce the speed.

Figures 7, 8:
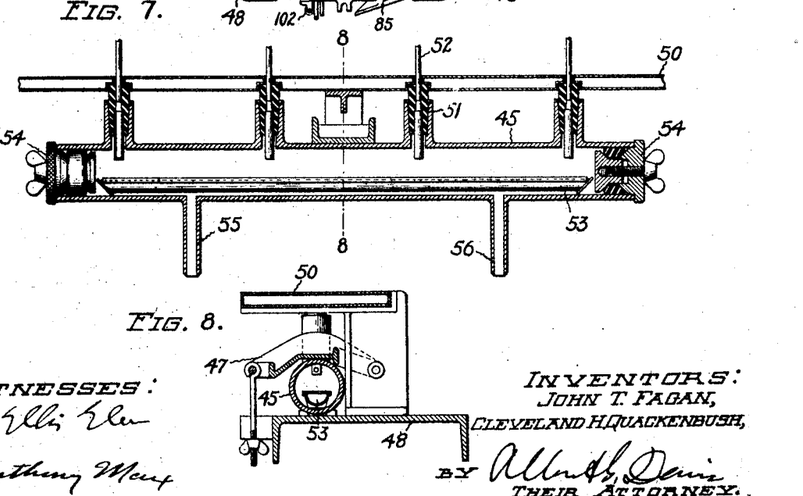
Figs. 7 and 8 are longitudinal and transverse vertical sections respectively of a manifold.
Figures 23, 24, 25, 26, 27:
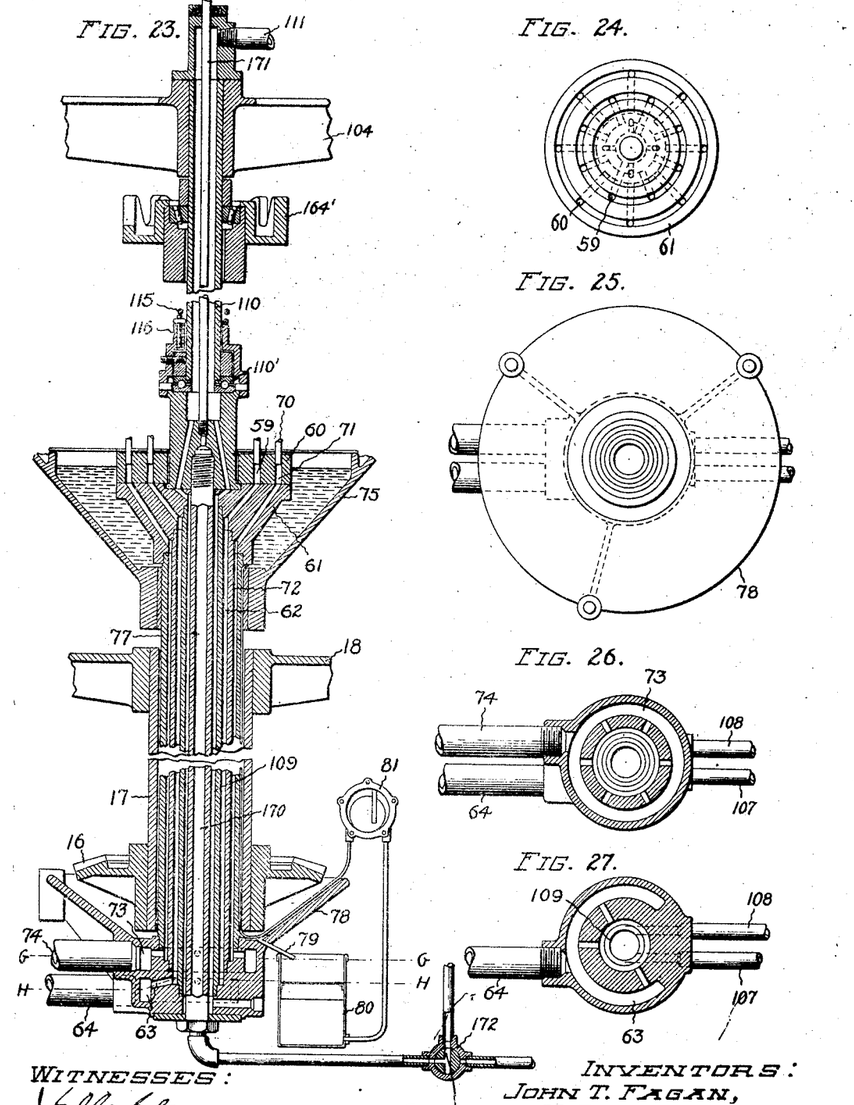
Fig. 23 is an enlarged vertical section through the center of the machine showing the valve and various ports.
Fig. 24 is a detail plan of a part of the valve.
Fig. 25 is a bottom plan view of the parts shown in Fig. 23.
Fig. 26 is a horizontal section on the line G—G.
Fig. 27 is a similar section on the line H—H.

Referring to Fig. 1 and others, it will be seen that there are provided in the specific machine shown eight manifolds 45, each of which are adapted to receive the exhaust tubes of four lamp bulbs 46. The said manifolds are suitably supported by clamps 47, which are carried by brackets 48 supported upon standards 49 carried by the table 10. Supported upon the brackets 48 is the annular water cooled plate 50 which extends entirely around the machine and serves as a bottom for the heater hood, as well as for additional guide and support for the exhaust tubes of the lamps. Referring to Figs. 7 and 8, it will be seen that the manifold 45 is provided on its upper side with four apertures containing rubber stoppers 51 which receive the exhaust tubes 52 of the lamps. The manifold may also contain a trough 53 containing a suitable dehydrating agent. Removable and air tight stopping pers 54 are provided for each end of the said manifold. Leading from the bottom of the manifold are two ports 55 and 56. The former is connected by means of rubber tube 57 to the tube 58 leading to the port 59 in a central valve comprising the movable member 60 and the stationary member 61, as shown in Fig. 23. The port 59 communicates with the annular passage 62, the bottom of which is connected to a passage 63 communicating with the pipe 64 leading to the rough pump (not shown).

The port 56 is connected by a rubber tube 65 to a trap 66, which connects through tube 67 with the inlet of the final pump. The outlet of said pump is connected to a trap 69 which is connected by means of tube 70 to the port 71 in the movable member 60 of the central valve. The port 71 is connected to an annular passage 72 which is connected at the bottom thereof to the annular passage 73 communicating with the pipe 74 leading to a backing pump (not shown). The movable member 60 of the central valve is connected to and moves with the annular trough 75 which contains oil for sealing the joint between the movable and stationary members of the said valve. The said trough is connected in turn by means of brackets 76 to standards supported upon the rotary table 10. A certain amount of the oil contained in the trough 75 flows out of the bottom thereof and serves to lubricate the bearing of the said trough on the central shaft 77. The oil flows down to and also lubricates the joint between the rotary sleeve 17, which carries the bevel-gear 18 forming part of the drive for the pumps. The said oil collects in the bottom of trough 78, from which it flows through spout 79 to the strainer 80. The oil is carried from the strainer by means of a pump 81 driven, for instance, as shown in Fig. 14, by the bevel-gear 24, to the upper trough 75.

Figure 9:
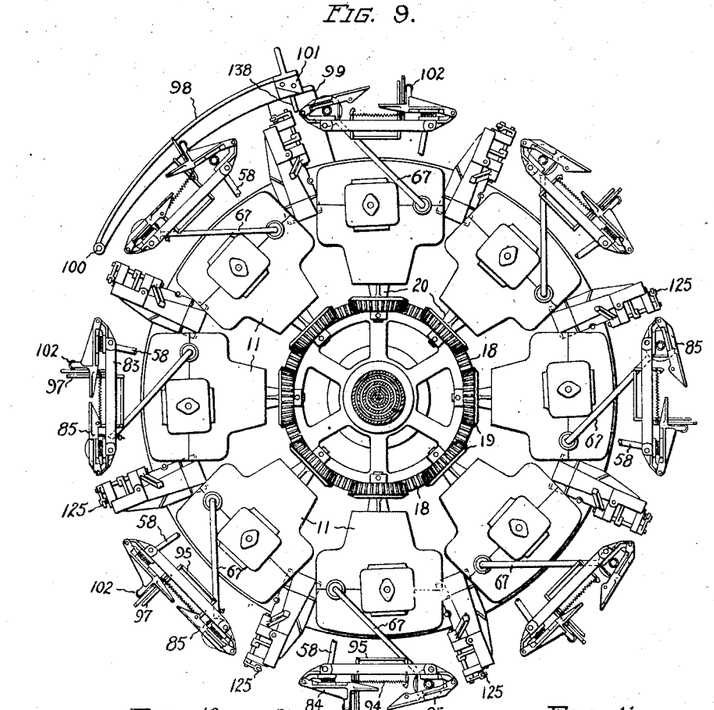
Fig. 9 is a horizontal section on the line C—C of Fig. 1.
Figure 20:
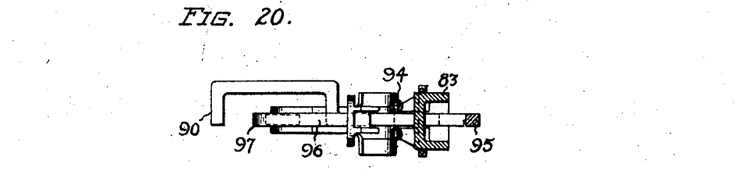
Fig. 20 is a side elevation, partly in section.

The clamping mechanism which operates upon the rubber tubes 57 and 65 for the rough and final pumps respectively, is shown best in Figs. 9 and 17 to 20 inclusive. Suitably supported by the brackets 48 and carried by the rotating table by means of the studs 82, are the clamping members shown in detail in Figs. 17 to 20 inclusive. The said clamps each comprise a stationary member or back 83, in which are swiveled the movable members 84 and 85. Each of these carries a stop 86 comprising pins passing through slots in the member 83 and serving to limit the outward throw of the said movable member. The member 84 has pivoted in a slot 87 in the same a latch 88 which in one position engages a pin 89 located in a slot in the member 83. As shown in Fig. 20, the latch 88 is bent upwardly at its outer end with a depending lug 90. Pivoted in a slot 91 of the member 83 is a latch 92 engaging a pin 93 of the member 85. The said latch is connected to the latch 88 by spring 94. The other end of the latch 92 is connected by means of pivoted lever 95 to a pivoted lever 96, which is pivoted in a slot in the member 83. The outer end 97 of the member 96 is disposed back of and on a level with end 90 of the latch 88. As shown in Fig. 9, an arcuate member 98 is supported through bracket 99 by the base of the machine. One end of the said member carries a trip 100, which is disposed in the path of and is adapted to engage the end of the latch 88 forcing it to the right and releasing it from the pin 89, thus allowing the member 84 to fly open. This opens a connection to the rough pump. At the other end of the member 98 is disposed a block 101, the inner face of which is oblique. This face engages a roller 102 carried by the member 84 and forces the said member to close and the latch 88 to again engage the pin 89. A slight further movement causes the end 97 of the lever 96 to be engaged by the said block, and this causes the latch 92 to be released and the member 85 to open. This opens the connection to the final pump. As shown in Fig. 9, the connection to the final pump remains open until a point M is reached, at which point it is closed by the operator, who seals off and removes the exhausted lamps.

Figure 4:
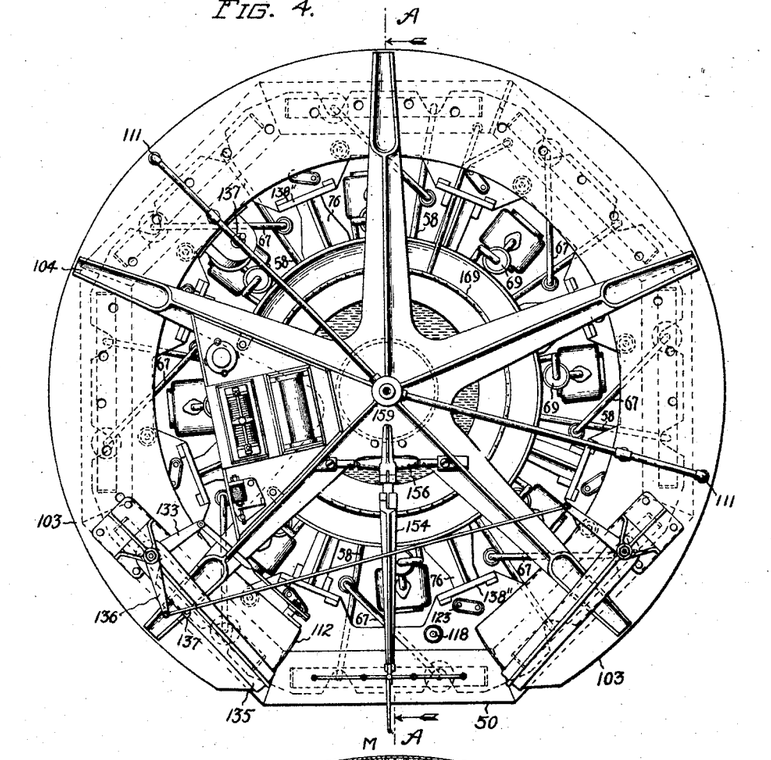
Fig. 4 is a top plan view of the machine.
Figure 5:
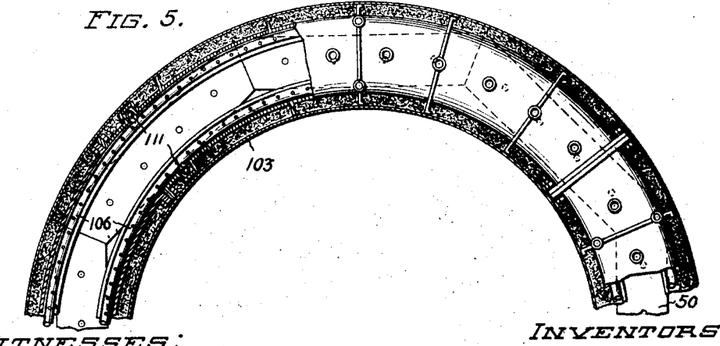
Fig. 5 is a detail horizontal sectional view of a portion of the heater.
Figure 6:
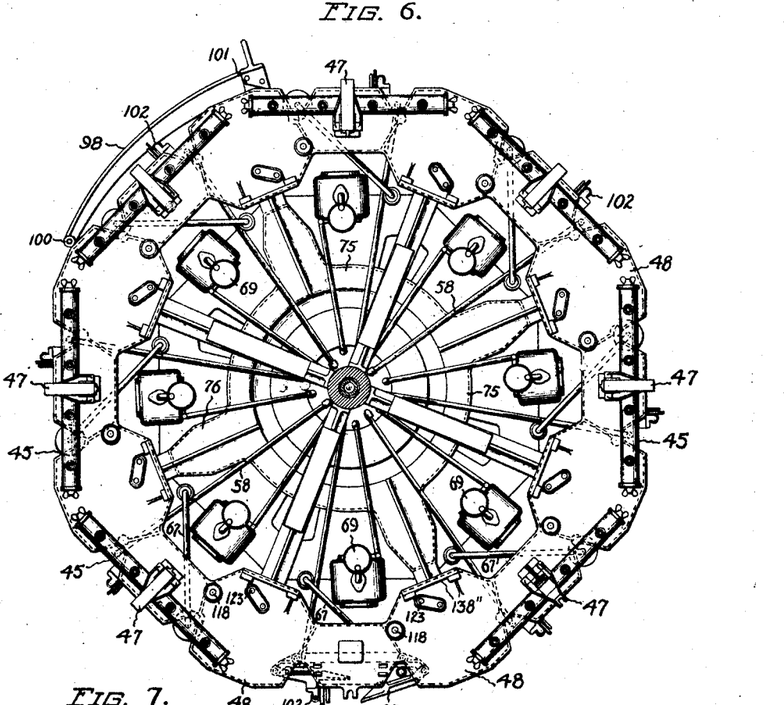
Fig. 6 is a horizontal section on the line B—B of Fig. 1.

The means for heating the lamps during the exhaust comprises a hood 103, which preferably has hollow walls filled with heat insulating material. The said hood is carried by a spider 104, the hub of which is fast to a central shaft 105. At the bottom of the heater is supported the gas burner 106, which extends entirely around and within the same. The gas and air for the said burner, as shown in Figs. 23 and 27, are supplied through pipes 107 and 108, which communicate with the annular passage 109, which in turn connects with the conduit 110 rotatably mounted on the block 110′. This is connected by pipe 111 with the said burner. The heater hood extends around the machine as shown in Fig. 4, except for a space, opposite the point M at which the operator is located, and which is substantially coextensive with the length of the manifold. As the operator removes the exhausted bulbs and replaces them with new bulbs, it is necessary for the heater hood to be turned to include the new lamps and to expose the next lot of exhausted lamps. As the ends of the said hood are provided with doors 112 and 113, as shown in Fig. 1 and others, it is necessary that means be provided for opening these doors prior to the rotation of the hood and for closing them afterward. It is desirable also that the rotation of the hood be automatically controlled by the starting of the rotation of the table 10 by the operator. This mechanism is shown in detail in Figs. 21 and 22.

Figures 21, 22:
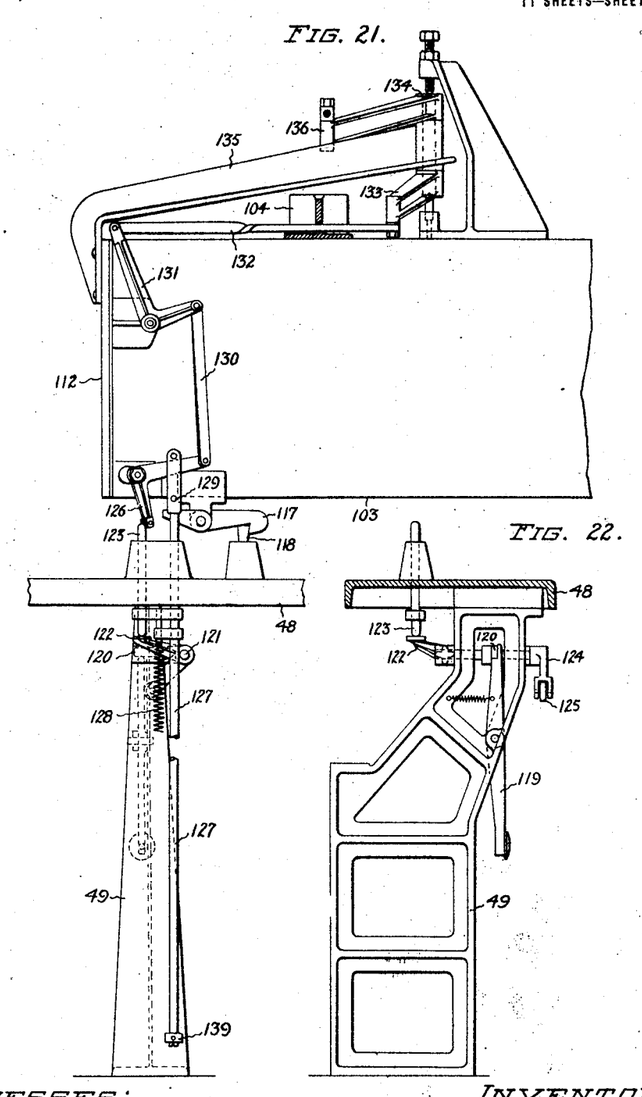
Fig. 21 is a detail front elevation showing the mechanism for shifting the heater and for opening and closing the doors thereof.
Fig. 22 is a side elevation of the same parts.

By reference to Fig. 3 is will be seen that the shaft 105, which carries the hood, carries a collar 114 to which is attached one end of a helical spring 115 surrounding the said shaft and attached at its other end to the stationary collar 116. The hood 103, as shown in Fig. 21, carries a pivoted latch 117, which engages one of a series of lugs 118 extending from the brackets 48 carried by the rotary table 10. While in engagement with one of the said lugs 118 the hood is rotated with the table and the spring 115 is wound up. A series of eight mechanisms is provided so that the operator may shift the heater for each set of lamps. Pivotally mounted on each of the standards 49 is an operating lever 119, one end of which is indented to receive the end 120 of an arm extending from the shaft 121 mounted in the said standard 49 and carrying an arm 122, engaging and supporting the end of stop pin 123 slidably supported in the bracket 48. The other end of the shaft 121 carries an arm 124, the end of which carries the roller 125. The hood 103 has pivotally supported at the bottom thereof a bell-crank 126, one end of which normally engages the pin 123. On the other arm of the bell-crank is loosely supported a depending rod 127, which is normally held in the position shown. The said rod has attached thereto a spring 128 and in the position shown said spring is in tension. The upper part of rod 127 carries a pin 129, which, upon the drop of the said rod as hereinafter described, engages the end of the latch 117 and opens the same. The bell-crank 126 is connected by means of the pivoted lever 130, bell-crank 131, strap 132 to arm 133 of the pivoted sleeve 134, which carries the arm 135 attached to the door 112. The said sleeve 134 also carries an arm 136 to which is pivoted the rod 137, which extends to a corresponding arm 136 attached to a sleeve 134 similar to that described.

Figure 10:
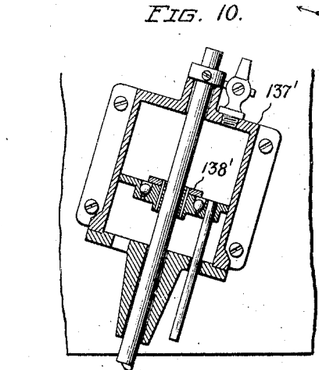
Fig. 10 is a vertical section of a dashpot constituting part of the heater moving mechanism.
Figure 11:
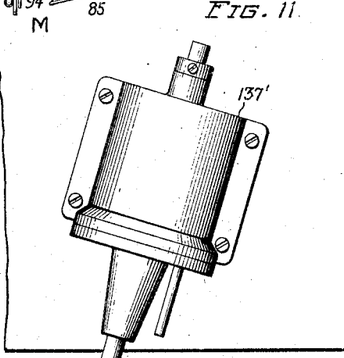
Fig. 11 is an elevation of the same shown in connection with the coöperating cam.

It will be apparent that when the lever 119 is pressed inwardly the arm 120 will be released causing the arm 122 to lower and with it the pin 123. Spring 128 then acts to lower the rod 127, thus causing the doors 112 and 113 to be opened through the levers and other connections actuated through the bell-crank 126. During the downward movement of the rod 127 the pin 129 strikes the end of the latch 117, releasing the same. The spring 115 then acts to rotate the hood until the latch 117 strikes another stop 118, and the end of bell-crank 126 engages another stop 123, which is in the raised position. This results in the actuation of the bell-crank 126 to close the doors 112 and 113 and to raise the rod 127. The resetting of the pin 123, which has just been lowered, is accomplished by the engagement of the roller 125 by the lug 138 on the member 98, which raises the same and the arm 120, causing the latter to drop into the indentation in the end of the lever 119 and to be there held so that the arm 120 and the pin 123 are kept in raised position. As shown in Figs. 4, 10 and 11, a dashpot 137′, comprising a piston 138′ carrying a rod having a roller at one end which rides in turn upon the inclined blocks 138″ is attached to the heater hood and takes away the jar which would otherwise occur upon its stop.

It will be understood that the machine is periodically stopped to permit the operator to remove the exhausted lamps and to put in certain new ones. This is accomplished by the blocks 139 carried at the end of one of rods 127 striking the end of arm 140 mounted on a shaft passing through sleeve 141, and which is connected by the rod 39, which has been hereinbefore described, and which actuates the clutch. Upon the lever 119 being pressed by the operator and the consequent dropping of the rod 127, the block 139 clears the arm 140 and the clutch is thrown in.

Figure 28:
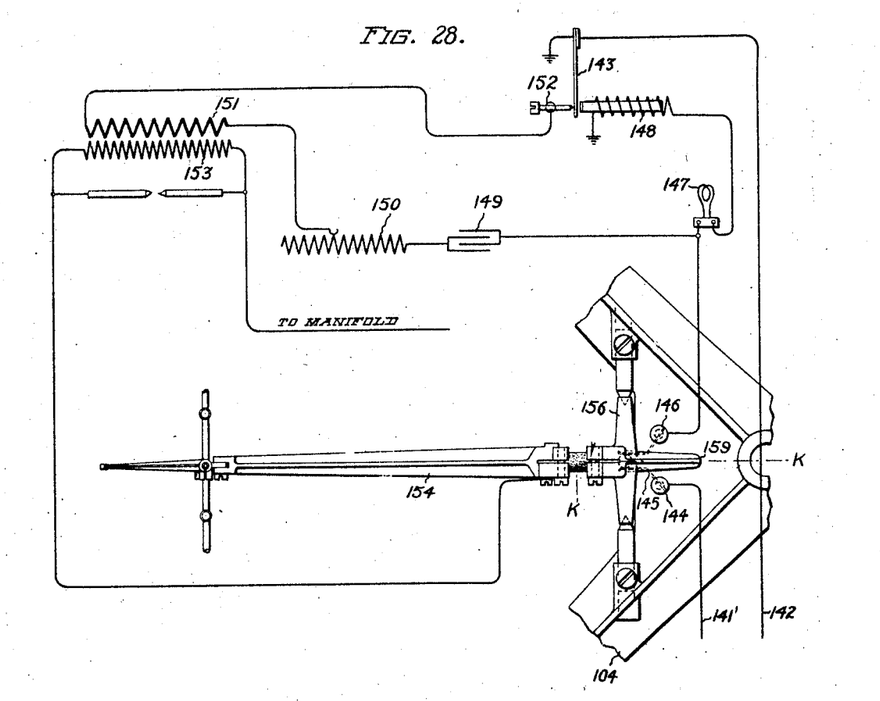
Fig. 28 is a plan view of the mechanism for testing the vacuum of the lamps, together with a diagram of the electric circuits.
Figure 29:
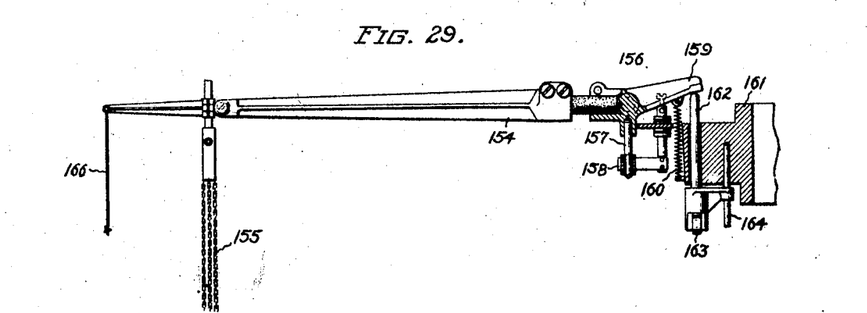
Fig. 29 is a vertical section on the line K—K of Fig. 28.

Before the lamps are removed it is necessary that they be tested to determine whether they have been properly evacuated. The ordinary way of doing this is to make the ends of the lamp the terminals of a high tension electric circuit. If the lamp is properly evacuated there will be no discharge. However, if there is any air in the lamp, a visible discharge will take place. The present invention comprises means for automatically submitting the lamps to a test when they reach the removal position. This means is shown in detail in Figs. 28 and 29. The leads 141′ and 142 are connected to a source of alternating current, for instance, a lighting circuit. The lead 142 is connected to the armature 143 of a vibrator, which is connected to the ground. The lead 141′ is connected to the binding post 144, which has attached thereto the spring contact 145. A corresponding spring contact is attached to a binding post 146, the circuit from which is divided, one branch being connected through a lamp 147 and the coil 148 of the vibrator to the ground. The other branch is connected through the condenser 149, resistance 150 and the primary coil 151 to the stationary contact 152 of the vibrator. One terminal of the secondary 153 of the induction coil is connected to the manifold 145. The other terminal is electrically connected to an arm 154, which carries a yielding contact member, such as chains 155, which in their lowered position of the said arm engage the tops of the lamps. The arm 154 is insulated from and supported in the holder 156, which is pivoted between two arms of spider 104, as shown in Figs. 4 and 28. The holder has a depending lug 157 carrying and insulated from the contact 158, which in the position shown, is located between and engages the spring contacts 145. The holder 156 carries the rearwardly projecting lug 159, which is connected by spring 160 to the hub 161 of spider 104. The hub 161 has passing therethrough and engaging the lug 159 a pin 162, the other end of which carries a roller 163. The said pin is slidable on the pin 164 depending from hub 161. When the heater hood is released, the roller 163 travels in a serrated cam member 164′, which, as shown in Fig. 3, is carried by standards 165 supported by the rotating table 10.

The up and down motion of the pin 162 due to the cam 164′, causes the contact 158 to be swung into and out of engagement with the spring contacts 145, thus making and breaking the circuit. The make occurs as the heater hood ends its movement to include new lamps and the break occurs immediately thereafter, due to the roller 163 dropping into a depression in cam 164′. There is a depression in the cam 164′ for each set of bulbs. The depressing and raising of the arm 154 and the engagement and disengagement of chains 155 with the lamp bulb occurs simultaneously with the make and break of the circuit. If desired, the automatic parts may be supplemented by means, such as the cord 166, which may be grasped by the operator to lower the arm 154 by hand.

The brackets 165 supporting the cam 164′ also serve to support, as shown in Fig. 3, a tank 167 holding water for cooling purposes. The water is circulated as by pump 168 driven by the final vacuum pump drive from tank 167 to the hollow plate 50 which serves as a bottom baffle for the heater. After passing around and through the plate 50 the water passes to a perforated pipe 169 from which it drips into tank 167 being cooled by contact with the air. As shown in Fig. 23, a central stationary pipe 170 having an upward extension 171 and connected to the water main through valve connections 172 may be provided for supplying water to the tank 167. The conduit between 171 and the tank is not shown.

What we claim as new and desire to secure by Letters Patent of the United States, is:—

1. An exhausting machine comprising movable means for holding an article to be exhausted, and a vacuum pump connected to said means and movable therewith.

2. An exhausting machine comprising a plurality of movable means for holding articles to be exhausted, and a plurality of vacuum pumps movable therewith, each of said pumps being connected to one of said holding means.

3. An exhausting machine comprising a means for holding an article to be exhausted, means for moving said holding means periodically past a predetermined point, and a vacuum pump connected to said holding means and movable therewith.

4. An exhausting machine comprising a plurality of means for holding articles to be exhausted, means for moving the said holding means periodically past a predetermined point, and a plurality of vacuum pumps each connected to one of said holding means and movable therewith.

5. An exhausting machine comprising a rotatable means for holding an article to be exhausted, and a vacuum pump connected to said holding means and rotatable therewith.

6. An exhausting machine comprising a plurality of means for holding articles to be exhausted, means for rotating said holding means, and a plurality of vacuum pumps each connected to one of said holding means and rotatable therewith.

7. An exhausting machine comprising a movable means for holding an article to be exhausted, a stationary rough vacuum pump, means for connecting and disconnecting said pump to said holding means during portions of its movement, and a final pump connected to said holding means and movable therewith.

8. An exhausting machine comprising a plurality of movable means for holding articles to be exhausted, a stationary rough vacuum pump and means for connecting and disconnecting the same to at least one of said holding means during portions of its travel, and a plurality of final vacuum pumps each connected to one of said holding means and movable therewith.

9. An exhausting machine comprising a movable means for holding an article to be exhausted, a stationary rough vacuum pump, a movable final vacuum pump and means for automatically connecting said holding means first to said rough pump and then to the final pump during its movement.

10. An exhausting machine comprising a rotary carrier having a means thereon for holding articles to be exhausted, a final pump rotatable with said carrier, a stationary rough pump, and means for automatically connecting said holding means first to said rough pump and then to said final pump during one rotation of the said carrier.

11. An exhausting machine comprising a movable holding means for holding a plurality of articles to be exhausted, a heater comprising a hood disposed over said articles and movable therewith, and means for shifting said hood to uncover a predetermined number of said articles when it is desired to remove the same.

12. An exhausting machine comprising a rotary carrier having means thereon for holding a plurality of articles to be exhausted, a heater comprising a hood extending partially around said carrier and covering a portion of said articles, and means for shifting the said heater hood so as to uncover a predetermined number of said articles when it is desired to remove the same.

13. An exhausting machine comprising a rotary carrier having means thereon for holding a plurality of articles to be exhausted, a heater comprising a hood having end doors and inclosing a predetermined number of said articles, and means for opening the said end doors and shifting the said heater hood so as to uncover a predetermined number of said articles when it is desired to remove the same.

14. An exhausting machine comprising a plurality of movable holding means for receiving articles to be exhausted, and means for causing a high tension electric discharge through certain of said articles automatically brought into operation at predetermined intervals during the movement of said holding means.

15. An exhausting machine comprising a rotary carrier having thereon a means for holding a plurality of articles to be exhausted, and means for causing a high tension electric discharge through certain of said articles automatically moved into and out of operative position with respect to said articles as they approach the same.

16. An exhausting machine comprising a rotary carrier having thereon holding means for receiving a plurality of articles to be exhausted, means comprising a yielding contact for causing a high tension electric discharge through certain of said articles, and means for bringing the same into and out of operative relation with respect to said articles as they approach the same.

17. An exhausting machine comprising a carrier having thereon means for holding a plurality of articles to be exhausted, a vacuum pump carried by said holding means, and a single driving means for said pump and carrier.

In witness whereof, we have hereunto set our hands this 27th day of November, 1914.

JOHN T. FAGAN.
CLEVELAND H. QUACKENBUSH.

Witnesses:
JOHN H. ANDERSON,
JOHN E. RYAN.